United States Patent
Tezawa

(10) Patent No.: US 12,420,352 B2
(45) Date of Patent: Sep. 23, 2025

(54) TIP DRESSER

(71) Applicant: KYOKUTOH CO., LTD., Aichi (JP)

(72) Inventor: Kazuhiro Tezawa, Aichi (JP)

(73) Assignee: Kyokutoh Co., Ltd., Aichi (JP)

( * ) Notice: Subject to any disclaimer, the term of this patent is extended or adjusted under 35 U.S.C. 154(b) by 702 days.

(21) Appl. No.: 17/775,825

(22) PCT Filed: Sep. 28, 2020

(86) PCT No.: PCT/JP2020/036622
§ 371 (c)(1),
(2) Date: Sep. 27, 2022

(87) PCT Pub. No.: WO2021/100319
PCT Pub. Date: May 27, 2021

(65) Prior Publication Data
US 2023/0017267 A1 Jan. 19, 2023

(30) Foreign Application Priority Data
Nov. 18, 2019 (JP) ................................ 2019-207981

(51) Int. Cl.
*B23K 11/36* (2006.01)
*B23K 11/30* (2006.01)

(52) U.S. Cl.
CPC .......... *B23K 11/3063* (2013.01); *B23K 11/36* (2013.01)

(58) Field of Classification Search
CPC ... B23K 11/3063; B23K 11/36; B23Q 11/005; B23Q 11/0053; B23Q 11/006; B23Q 11/0067; B23Q 11/0046
See application file for complete search history.

(56) References Cited

U.S. PATENT DOCUMENTS

| 6,106,203 A * | 8/2000 | Asmis ................ B23K 11/3063 409/137 |
| 2010/0143061 A1 | 6/2010 | Decker et al. |
| 2015/0360315 A1* | 12/2015 | Kusano ................... B08B 15/04 15/347 |

(Continued)

FOREIGN PATENT DOCUMENTS

| CN | 1509837 A * | 7/2004 | .......... B23Q 11/005 |
| DE | 19905478 A1 | 8/2000 | |

(Continued)

OTHER PUBLICATIONS

English translation of CN 1509837 (Year: 2004).*

(Continued)

*Primary Examiner* — Alan Snyder
(74) *Attorney, Agent, or Firm* — Ruggiero McAllister & McMahon LLC

(57) ABSTRACT

A chip collection unit is provided under a body case. The unit includes a chip guiding member on one lateral side of a chip falling area that is downward of the lower communication hole, and a first air discharge unit on another lateral side of the chip falling area. The member includes at one end a chip collection port located corresponding to the chip falling area, and is connected at another end to a chip collector capable of collecting the chips. The first air discharge unit includes an air nozzle configured to discharge compressed air towards the chip collection port.

4 Claims, 5 Drawing Sheets

(56) References Cited

U.S. PATENT DOCUMENTS

2016/0279733 A1    9/2016  Nakajima

FOREIGN PATENT DOCUMENTS

| | | | |
|---|---|---|---|
| JP | 2003-80374 A | 3/2003 | |
| KR | 101282861 B1 | 7/2013 | |
| KR | 10-1696263 B1 | 1/2017 | |
| KR | 101848304 * | 4/2018 | ......... B23K 11/3063 |
| WO | 2015-189872 A1 | 12/2015 | |
| WO | 2016151623 A1 | 9/2016 | |
| WO | 2019202710 A1 | 10/2019 | |

OTHER PUBLICATIONS

English translation of KR 101848304 (Year: 2018).*
Indian First Examination Report dated Oct. 25, 2022 from Indian Patent Application No. 202217033671, 6 pages.
Extended European Search Report dated Jan. 5, 2023 from European Patent Application No. 20889770.2.
Chinese Office Action dated Feb. 10, 2023 from corresponding Chinese Patent Application No. 202080079814.2.
Japanese Office Action dated Feb. 28, 2023 from corresponding Japanese Patent Application No. 2019-207981.
International Search Report dated Dec. 8, 2020 from International Patent Application No. PCT/JP2020/036622, 5 pages.
Written Opinion dated Dec. 8, 2020 from International Patent Application No. PCT/JP2020/036622, 3 pages.
Canadian Office Action dated Aug. 1, 2023 from corresponding Canadian Patent Application No. 3, 157,787, 5 pages.
Chinese Office Action dated Aug. 18, 2023 from corresponding Chinese Patent Application No. 202080079814.2, 14 pages.

* cited by examiner

FIG.5

| | | | Chip collection rate |
|---|---|---|---|
| Experiment A | Number of uncollected chips | 10 | 100% |
| | Number of cutting | 1125 | |
| | Chip colection rate | 99.556% | |
| Experiment B | Number of uncollected chips | 10 | 180% |
| | Number of cutting | 2025 | |
| | Chip colection rate | 99.753% | |

TIP DRESSER

CROSS REFERENCE TO RELATED APPLICATION

This application is a national stage entry of International Application No. PCT/JP2020/036622 filed on Sep. 28, 2020, which claims priority from Japanese Application No. 2019-207981 filed on Nov. 18, 2019, each of which is incorporated herein by reference in its entirety.

BACKGROUND OF THE DISCLOSURE

1. Field of the Disclosure

The present disclosure relates to a tip dresser for cutting a distal end of an electrode tip for spot welding.

2. Description of the Related Art

In conventional automobile production lines, spot welding is extensively used for assembling a vehicle body. In spot welding, when a welding operation is repeated, an oxide film builds up on an electrode tip distal end, and the welding performed in such condition causes deteriorated quality of a welded portion. For this reason, it is necessary to cut periodically the electrode tip distal end using a tip dresser to remove the oxide film.

When chips created upon cutting the electrode tip using the tip dresser scatter and stick to a drive unit, etc., of another apparatus, the chips increase the load on the drive unit, and in a most unwanted case, may cause a breakdown of the apparatus. Such tip dresser is generally devised to prevent the chips from scattering around.

For example, Patent literature 1 discloses a tip dresser including a housing case that has a hollow part therein, the housing case including upper and lower communication holes that are communicated with the hollow part and located opposite one another vertically. A rotary holder located in the hollow part between the upper and lower communication holes is axially supported in the housing case such that the rotary holder is rotatable about its vertically extending axis of rotation. The rotary holder includes, at a location of the rotary holder facing the upper communication hole, an upper curved recess that is open upwardly, and at a location of the rotary holder facing the lower communication hole, a lower curved recess that is open downwardly. The rotary holder includes a penetrating part extending therethrough vertically. The penetrating part includes an inner face to which a plate-shaped cutting plate having a pair of upper and lower cutting blades is attached. When the rotary holder is being rotated, one of a pair of electrode tips opposing one another is inserted in the upper curved recess through the upper communication hole and the other is inserted in the lower curved recess through the lower communication hole, and thereby the cutting plate cuts respective distal ends of the electrode tips.

A suction unit capable of applying suction for chips is attached under the housing case via a mounting bracket. The suction unit includes a cylindrical member configured to generate an airflow therein along its cylinder center line by introducing compressed air into the cylindrical member; and a chip guiding member having a chip guiding passage therein. The chip guiding member includes on one end thereof a chip suction port located near the lower communication hole and is on another end thereof connected to an upstream opening of the cylindrical member. The suction unit is configured such that when chips produced at the penetrating part during a cutting operation fall in a chip falling area located downwardly of the lower communication hole, the chips are sucked from the chip suction port of the chip guiding member into the chip guiding member by means of the airflow having generated inside the cylindrical member. The chips having sucked from the chip suction port into the chip guiding member pass through the interiors of the chip guiding member and cylindrical member in that order to convey to a chip collector. Thus, the chips produced during the cutting operation of the electrode tip are prevented from scattering around the device.

CITATION LIST

Patent Literature

[Patent Literature 1] Korean Patent No. 10-1696263

SUMMARY OF INVENTION

Since Patent literature 1 is configured to collect the chips by sucking the air of the chip falling area into the chip guiding member, air flows in the chip falling area in different directions toward the chip suction port when the suction unit is actuated. Thus, a large difference in suction force of the suction unit in the chip falling area is created between locations near and away from the chip suction port. When the chips produced at the penetrating part during the cutting operation fall in the chip falling area located downwardly of the lower communication hole, the chips are unfailingly sucked into the chip suction port and collected by the chip collector as passing through a region of the chip falling area near the chip suction port, and the chips may not be sucked into the chip suction port and drop without being collected as passing through a region of the chip falling area away from chip suction port.

The present disclosure is made in view of the foregoing and an object of the present disclosure is to provide a tip dresser highly capable of collecting chips.

To achieve the object, the present disclosure is characterized by providing, on one lateral side of a chip falling area located downwardly of a lower communication hole of a housing case, a chip guiding member having a chip collection port, and, on another lateral side of the chip falling area, an air discharge unit configured to discharge compressed air towards the chip collection port.

Specifically, the present disclosure is directed to a tip dresser including a housing case including a hollow part located therein and upper and lower communication holes opposing one another, the upper and lower communication holes communicating with the hollow part; a rotary holder located in the hollow part between the upper and lower communication holes and axially and rotatably supported in the housing case, the rotary holder including a pair of curved recesses corresponding to the respective upper and lower communication holes and a penetrating part extending through along an axis of rotation; and a cutting member attached to an inner face of the penetrating part; in which one of a pair of opposing electrode tips for spot welding is inserted into one of the curved recesses through the upper communication hole and another of the pair of the electrode tips is inserted into another of the curved recesses through the lower communication hole in the state that the rotary holder is being rotated, and thereby the cutting member cuts respective distal ends of the electrode tips. The following solutions are then applied.

According to a first aspect of the present disclosure, a chip collection unit is provided under the housing case, the chip collection unit configured to collect chips produced in the penetrating part during a cutting operation and falling downwardly through the lower communication hole, the chip collection unit including a chip guiding member provided on one lateral side of a chip falling area that is located downwardly of the lower communication hole, the chip guiding member including at one end thereof a chip collection port located corresponding to the chip falling area, and being connected at another end thereof to a chip collector capable of collecting the chips; and a first air discharge unit provided on another lateral side of the chip falling area, the first air discharge unit including an air nozzle configured to discharge compressed air towards the chip collection port.

According to a second aspect of the present disclosure which is an embodiment of the first aspect, a second air discharge unit is placed in close proximity above the housing case, the second air discharge unit configured to discharge compressed air towards the rotary holder.

According to a third aspect of the present disclosure which is an embodiment of the first or second aspect, the air nozzle includes a plurality of air discharge holes arranged in parallel in a range corresponding to the chip falling area in a horizontal direction orthogonal to a direction in which the first air discharge unit and the chip guiding member are arranged in parallel, the plurality of air discharge holes extending towards the chip collection port.

According to a fourth aspect of the present disclosure which is an embodiment of the third aspect, the air discharge holes each extend downwardly at an angle from a location near a bottom surface of the housing case towards the chip collection port.

In the first aspect, pressing force of the compressed air moving toward the chip collection port in the chip falling area is smaller in a region near the chip collection port and larger in a region away from the chip collection port. When falling in the region of the chip falling area near the chip collection port, the chips are pushed into the chip collection port even by the compressed air of the smaller pressing force, and even when falling in the region of the chip falling area away from the chip collection port, the chips are conveyed to the chip collection port by the compressed air of the larger pressing force. Thus, the chips falling into the chip falling area can be conveyed to the chip collection port by means of the compressed air, without scattering around the device, even when the chips are located not only in the region near the chip collection port, but also in the region away from the chip collection port, and unfailingly introduced into the chip guiding member.

In the second aspect, the compressed air discharged from the second air discharge unit passes downwardly through the penetrating part of the rotary holder, and thereby the chips can unfailingly fall downwardly without remaining caught at the rotary holder. While part of the compressed air discharged from the air nozzle of the first air discharge unit is likely to enter into the housing case through the lower communication hole and to pass upwardly through the penetrating part of the rotary holder, the compressed air discharged from the second air discharge unit prevents the compressed air discharged from the air nozzle of the first air discharge unit from passing upwardly through the penetrating part. Therefore, the chips produced in the penetrating part during the cutting operation can avoid moving upwardly off of the penetrating part by the compressed air discharged from the air nozzle of the first air discharge unit, without falling down. Thus, the chips can be unfailingly prevented from scattering around the device from an upper opening portion of the penetrating part.

In the third aspect, the compressed air discharged from the air discharge holes of the air nozzle moves towards the chip collection port to spread over the whole region of the chip falling area without gaps. Thus, wherever in the chip falling area the chips fall, the chips can be unfailingly introduced into the chip guiding member through the chip collection port without scattering around the device.

In the fourth aspect, an amount of change in a moving direction of the chips falling in the chip falling area to change the direction towards the chip collection port, is smaller as compared to the case where the compressed air is horizontally discharged from the air nozzle towards the chip collection port. Therefore, the chips having fallen in the chip falling area can be smoothly introduced into the chip collection port by means of the compressed air, and efficiently collected.

BRIEF DESCRIPTION OF DRAWINGS

FIG. 5 is a table presenting study results for chip collection rates of tip dressers of an embodiment of the present disclosure, and of a conventional structure.

DESCRIPTION OF EMBODIMENTS

Embodiments of the present disclosure are described in detail below with reference to the drawings. It is noted that the following description of preferred embodiments is merely an example in nature.

Figure 1:
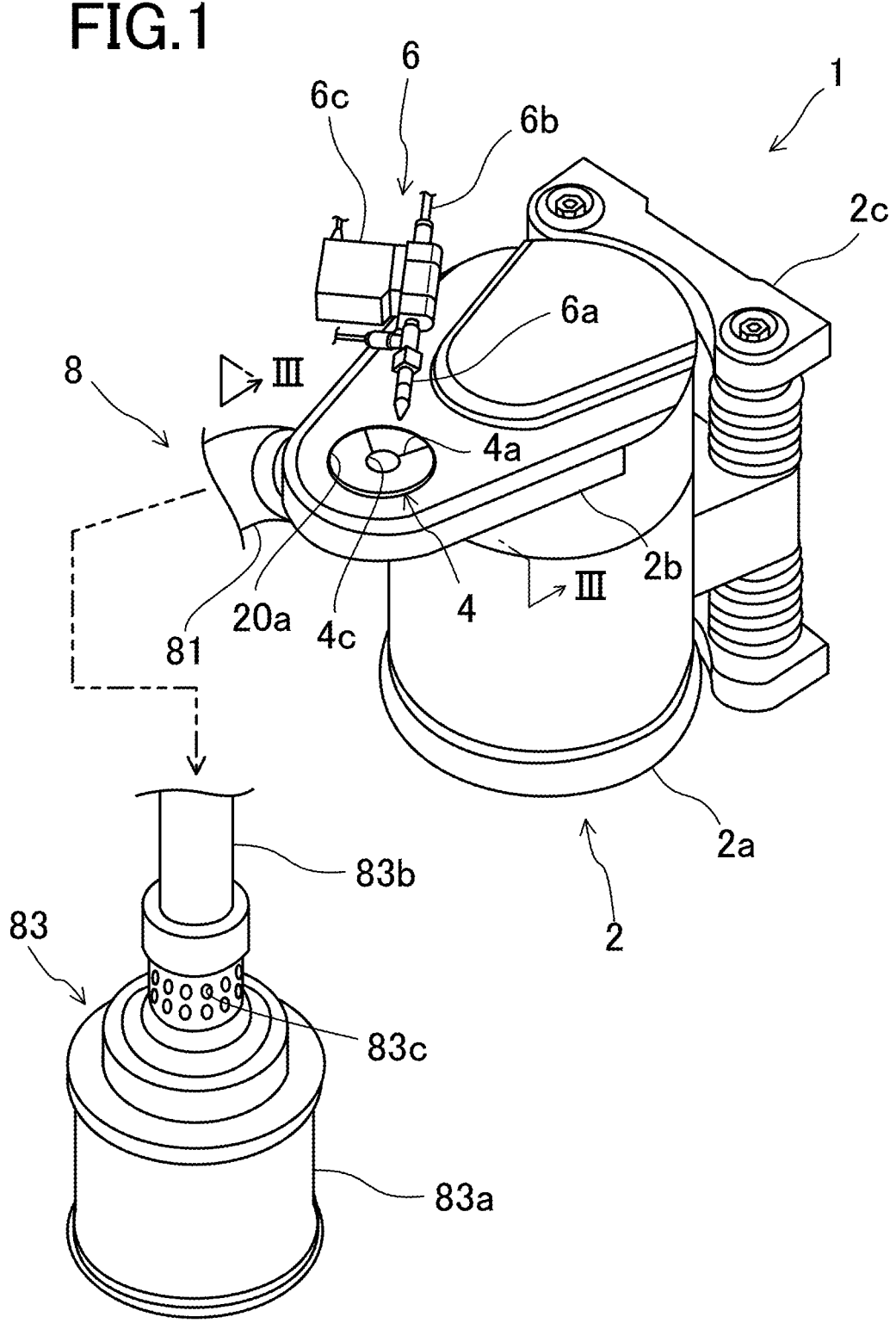
FIG. 1 is a perspective view of a tip dresser according to an embodiment of the present disclosure.
Figure 2:
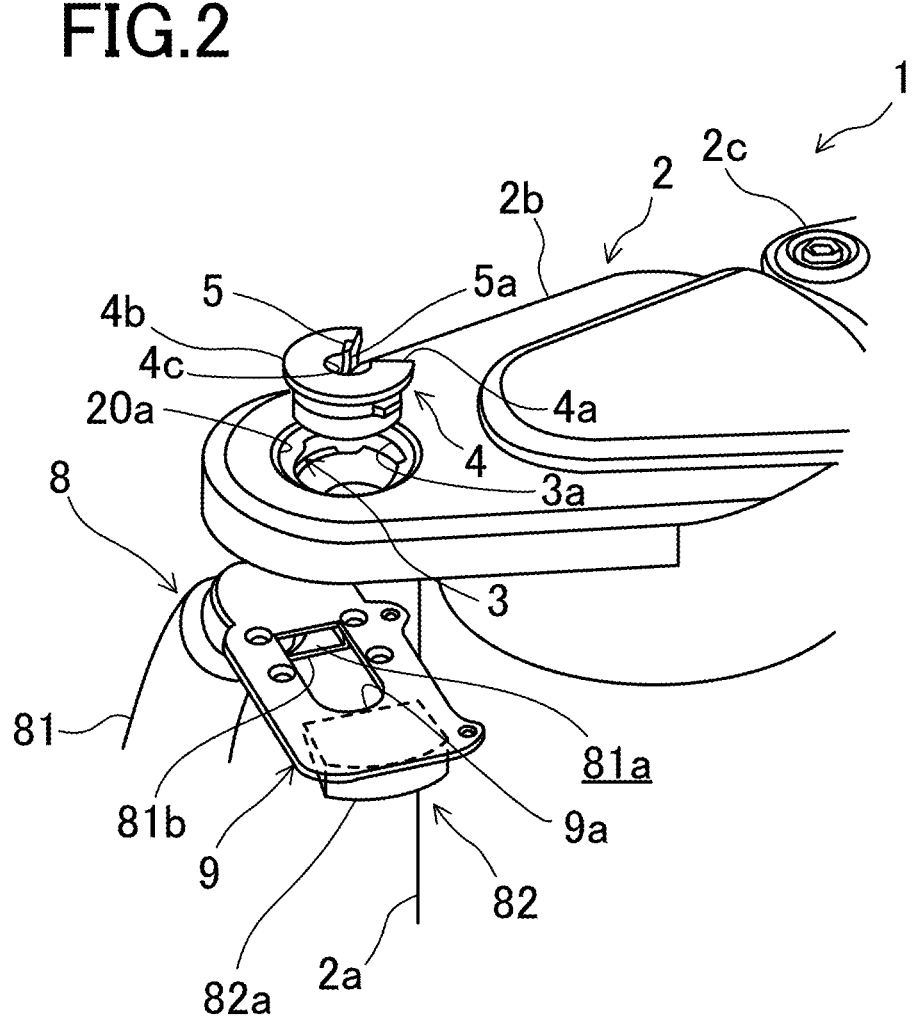
FIG. 2 is an enlarged exploded perspective view of a tip dresser according to an embodiment of the present disclosure.
Figure 3:
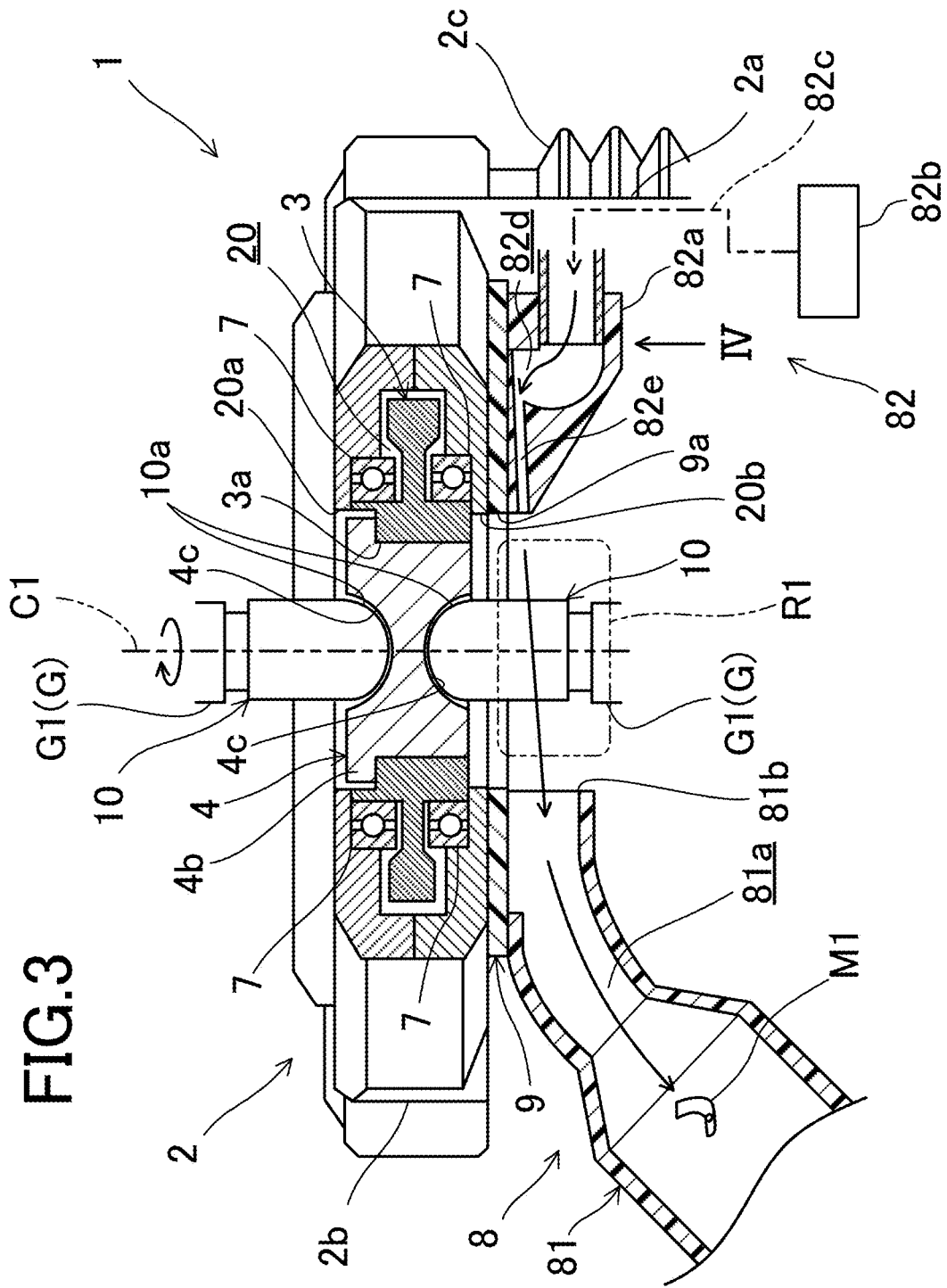
FIG. 3 is a cross-sectional view taken along line Ill-Ill indicated in FIG. 1.
Figure 4:
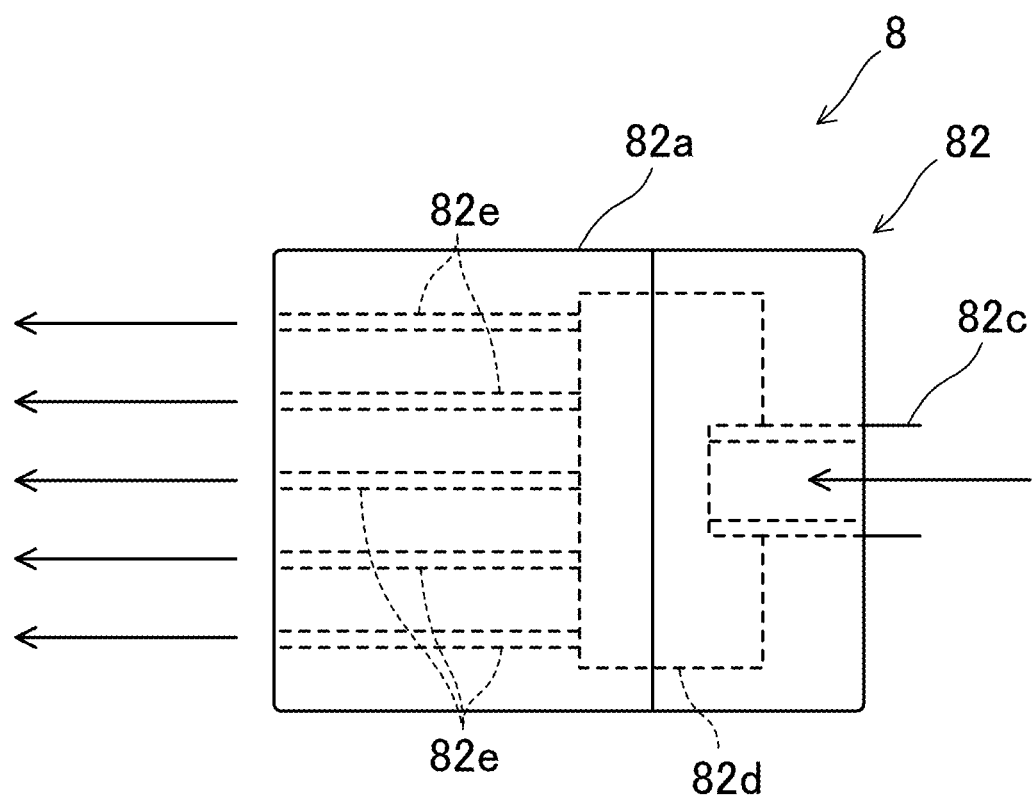
FIG. 4 is a fragmentary view taken in the direction of arrow IV indicated in FIG. 3.

FIGS. 1 to 3 show a tip dresser 1 according to an embodiment of the present disclosure. The tip dresser 1 is used for simultaneously cutting curved distal ends 10a of a pair of electrode tips 10 for spot welding, the electrode tips 10 being inserted onto respective distal ends of shanks G1 of a welding gun (not shown) to oppose one another. The tip dresser 1 includes a body case 2 (housing case) having a hollow part 20 therein and being generally L-shaped in the side view.

The body case 2 includes a bottomed cylindrical motor housing 2a housing a drive motor (not shown), and a holder housing 2b extending laterally in a generally horizontal direction from an upper portion of the motor housing 2a and being generally in the shape of a tear drop in the planar view. A shock absorbing mechanism 2c for absorbing impact applied on the body case 2 is attached to a side of the motor housing 2a on a base end side of the holder housing 2b.

The holder housing 2b is in the shape of a plate having a substantial thickness. Upper and lower communication holes 20a, 20b located opposite one another vertically and communicating with the hollow part 20 are formed in a center of an extending portion of the holder housing 2b.

As shown in FIG. 3, a ring-shaped output gear 3 is located inside the holder housing 2b between the upper and lower communication holes 20a, 20b and axially supported in the holder housing 2b such that the output gear 3 is rotatable about a vertically extending axis of rotation C1 via a pair of upper and lower bearings 7. The drive motor housed in the motor housing 2a is configured to drive in rotation the output gear 3 via a gear meshing mechanism (not shown).

The output gear 3 includes a mounting hole 3a extending therethrough vertically. A disk-shaped rotary holder 4 is mounted in the mounting hole 3a.

The rotary holder 4 is generally C-shaped in the planar view, and has a cutaway part 4a (penetrating part). The cutaway part 4a (penetrating part) progressively circumferentially expands around the axis of rotation C1 as the rotary holder 4 extends radially outwardly from the axis of rotation C1, and is open laterally outwardly and vertically.

The cutaway part 4a thus extends through along the axis of rotation C1.

A flange 4b extending laterally outwardly beyond other portions of the rotary holder 4 is formed on an upper peripheral edge of the rotary holder 4.

Furthermore, a pair of curved recesses 4c having a progressive decrease in diameter toward a center part of the rotary holder 4 are formed symmetrically along a direction of the axis of rotation C1 on respective top and bottom surfaces of the rotary holder 4. Each of the curved recesses 4c corresponds to associated one of the upper and lower communication holes 20a, 20b.

The curved recess 4c has a shape corresponding to the curved shape of the distal end 10a of the electrode tip 10 and configured to allow the distal end 10a of the electrode tip 10 to be inserted in the state where a central axis of the electrode tip 10 is aligned with the axis of rotation C1.

As shown in FIG. 2, a cutter 5 (cutting member) for cutting the distal end 10a of the electrode tip 10 is attached to one of inner faces of the cutaway part 4a, the inner face extending laterally outwardly from the axis of rotation C1.

The cutter 5 includes a pair of cutting blades 5a extending along a direction intersecting with the axis of rotation C1 and formed symmetrically in the direction along the axis of rotation C1. The cutting blades 5a have a gently curved shape to correspond to the respective curved recesses 4c.

Then, as one of the pair of the electrode tips 10 opposing one another is inserted in an upper curved recess 4c through the upper communication hole 20a and the other is inserted in a lower curved recess 4c through the lower communication hole 20b in the state where the rotary holder 4 is being rotated, the cutting blades 5a of the cutter 5 cut the respective distal ends 10a of the electrode tips 10.

As shown in FIG. 3, a chip collection unit 8 for applying suction for chips M1 is attached to a bottom portion of the holder housing 2b of the body case 2 via a mounting bracket 9.

The chip collection unit 8 includes a chip guiding member 81 provided on one lateral side of a chip falling area R1 located downwardly of the lower communication hole 20b of the body case 2, a first air discharge unit 82 provided on another lateral side of the chip falling area R1, and a chip collector 83 capable of collecting chips M1.

The chip guiding member 81 extends to curve gently such that the chip guiding member 81 is located progressively downwardly as the chip guiding member 81 extends away from the first air discharge unit 82 in a horizontal direction. The chip guiding member 8 has a chip guiding passage 81a therein, and the chip guiding passage 81a is configured to guide chips M1.

The chip guiding member 81 includes at one end thereof a wider rectangular chip collection port 81b located corresponding to the chip falling area R1 and communicating with the chip guiding passage 81a. The chip guiding member 81 is connected at another end thereof to the chip collector 83.

The first air discharge unit 82 includes an air nozzle 82a secured on a bottom surface of the mounting bracket 9 and an air compressor 82b for supplying compressed air to the air nozzle 82a.

The air nozzle 82a is a block member having a generally triangular shape in the front view to have a vertical width that becomes progressively narrower towards the chip guiding member 81. The air nozzle 82a is connected on a side opposite to the chip guiding member 81 to a pipe 82c extending from the air compressor 82b.

The air nozzle 82a includes an air reservoir 82d therein and the air reservoir 82d has a semicircular cross section and extends in a direction orthogonal to a direction in which the chip guiding member 81 and the first air discharge unit 82 are arranged in parallel. The air reservoir 82 communicates with the pipe 82c.

A plurality of long and narrow air discharge holes 82e are, on a chip guiding member 81 side of the air nozzle 82a, arranged in parallel in a range corresponding to the chip falling area R1 in a horizontal direction orthogonal to the direction in which the chip guiding member 81 and the first air discharge unit 82 are arranged in parallel.

The air discharge holes 82e each provide communication of the air reservoir 82d with the outside of the air nozzle 82a.

The air discharge holes 82e each extend downwardly at an angle from a location near a bottom surface of the body case 2 towards the chip collection port 81b. The air discharge holes 82e are configured to discharge towards the chip collection port 81b compressed air supplied from the air compressor 82b to the air reservoir 82d.

As shown in FIG. 1, the chip collector 83 includes a generally cylindrical storing box 83a capable of storing the chips M1 inside the storing box 83a, and a connecting tube 83b connecting the storing box 83a and a downstream opening portion of the chip guiding member 81 to provide communication of the chip guiding passage 81a with an inside of the storing box 83a. A plurality of vent holes 83c for venting the inside air of the connecting tube 83b into the outside are formed in a wall of a storing box 83a side of the connecting tube 83b.

As illustrated in FIG. 2, the mounting bracket 9 is generally rectangular plate-shaped and includes an opening 9a corresponding to the lower communication hole 20b.

As shown in FIG. 1, a second air discharge unit 6 for discharging compressed air towards the rotary holder 4 through the upper communication hole 20a is placed in close proximity above the body case 2.

The second air discharge unit 6 includes a generally pencil-shaped discharge nozzle 6a for discharging compressed air, a pipe 6b for introducing the compressed air into the discharge nozzle 6a, and a box-shaped solenoid valve 6c connected to a midsection of the pipe 6b for control the discharge of the compressed air from the discharge nozzle 6a.

The pipe 6b is connected to a midsection of the pipe 82c, and the discharge nozzle 6a is configured to discharge compressed air supplied from the air compressor 82b through the pipe 6b.

When the distal ends 10a of the electrode tips 10 are cut by the cutter 5 in the state where the compressed air is continuously discharged from the air nozzle 82a towards the chip collection port 81b, the chips M1, which are created in the cutaway part 4a of the rotary holder 4 during a cutting operation on the electrode tips 10 by the cutter 5 and are falling downwardly through the lower communication hole 20*b*, are pushed by the compressed air from the chip collection port 81*b* into the chip guiding passage 81*a* and introduced into the chip guiding passage 81*a*, to be collected in the chip collector 83.

Next, a cutting operation on a distal end 10*a* of an electrode tip 10 performed by the tip dresser 1 is described in detail.

First, as shown in FIG. 3, the output gear 3 is rotated by driving in rotation the drive motor (not shown) of the tip dresser 1 to thereby rotate the rotary holder 4 about the axis of rotation C1.

The air nozzle 82*a* and the discharge nozzle 6*a* are also supplied with compressed air using the air compressor 82*b* to thereby discharge the compressed air from the air nozzle 82*a* and the discharge nozzle 6*a*.

Then, a pair of electrode tips 10 opposing vertically are moved to above and below the holder housing 2*b* respectively to align a central axis of each of the electrode tips 10 with the axis of rotation C1 of the rotary holder 4.

Subsequently, the electrode tips 10 are brought closer to one another. While upper one of the electrode tips 10 is inserted in the upper curved recess 4*c* of the rotary holder 4 through the upper communication hole 20*a* of the holder housing 2*b*, lower one of the electrode tips 10 is inserted in the lower curved recess 4*c* of the rotary holder 4 through the lower communication hole 20*b* of the holder housing 2*b*. The distal ends 10*a* of the electrode tips 10 are then cut by the cutter 5 attached to the rotary holder 4.

In the operation, the compressed air discharged from the discharge nozzle 6*a* passes downwardly through the cutaway part 4*a* of the rotary holder 4, and thereby chips M1 produced from the distal ends 10*a* of the electrode tips 10 unfailingly fall downwardly without remaining caught at the rotary holder 4. Thus, the chips M1 fall through the opening 9*a* of the mounting bracket 9 into the chip falling area R1 located downwardly of the lower communication hole 20*b*.

The chips M1 having fallen in the chip falling area R1 change their direction towards the chip collection port 81*b* due to a high-speed airflow from the air nozzle 82*a* toward the chip collection port 81*b* (so-called air shield), to enter into the chip guiding passage 81*a* through the chip collection port 81*b*.

That is, the compressed air discharged from the air nozzle 82*a* pushes the chips M1 having fallen in the chip falling area R1, into the chip guiding passage 81*a* through the chip collection port 81*b*.

In the operation, while part of the compressed air discharged from the air discharge holes 82*e* of the air nozzle 82*a* is likely to enter into the body case 2 through the lower communication hole 20*b* and to pass upwardly through the cutaway part 4*a* of the rotary holder 4, the compressed air discharged from the discharge nozzle 6*a* prevents the compressed air discharged from the air nozzle 82*a* from passing upwardly through the cutaway part 4*a*. Therefore, the chips M1 produced in the cutaway part 4*a* during the cutting operation can avoid moving upwardly off of the cutaway part 4*a* due to the compressed air discharged from the air nozzle 82*a*, without falling down. Thus, the chips M1 can be unfailingly prevented from scattering around the device from an upper opening portion of the cutaway part 4*a*.

The chips M1 having entered into the chip guiding passage 81*a* from the chip collection port 81*b* then move to the chip collector 83 while being guided by the chip guiding passage 81*a*, and are collected in the chip collector 83.

Next, evaluation results for chip collection rates of the tip dresser 1 according to the embodiment of the present disclosure are explained.

FIG. 5 shows results of experiment as to whether the tip dresser 1 of the embodiment of the present disclosure has improved chip collection rates as compared to a tip dresser of a conventional structure as in Patent literature 1. In the experiment, a tip dresser of the conventional structure and a tip dresser 1 of the embodiment of the present disclosure were each provided, and the number of chips M1 that were not collected by the chip collector 83 was counted while repeated cutting of distal ends 10 of electrode tips 10 was performed with the tip dressers, and the cutting was then repeated until the number of the uncollected chips M1 was ten. Then, the number of the cutting determined when the number of the uncollected chips M1 in each experiment was ten is studied, and the number of the cutting in the experiment for the tip dresser of the conventional structure was used as a reference (the collection rate is 100%) and compared to the result of the experiment for the tip dresser 1. FIG. 5 shows experiment A performed using the tip dresser of the conventional structure and experiment B performed using the tip dresser 1 of the embodiment of the present disclosure. Conditions of the cutting in one operation in each experiment are 150 kgf of press force of the electrode tip 10 on the rotary holder 4, one second of cutting time, and 273 rpm of the number of rotation of the rotary holder 4.

The results of the experiments confirmed that the use of the tip dresser 1 according to the embodiment of the present disclosure significantly improved the chip collection rate as compared to the tip dresser of the conventional structure. This is viewed because the tip dresser 1 according to the embodiment of the present disclosure is configured to discharge the compressed air from the air nozzle 82*a* towards the chip collection port 81*b* and thus, pressing force of the compressed air moving toward the chip collection port 81*b* in the chip falling area R1 is smaller in a region near the chip collection port 81*b* and larger in a region away from the chip collection port 81*b*, and when falling in the region of the chip falling area R1 near the chip collection port 81*b*, the chips M1 are pushed into the chip collection port 81*b* even by the compressed air of the smaller pressing force, and even when falling in the region of the chip falling area R1 away from the chip collection port 81*b*, the chips M1 are conveyed to the chip collection port 81*b* by the compressed air of the larger pressing force.

According to the embodiment of the present disclosure, the chips M1 falling into the chip falling area R1 can be conveyed to the chip collection port 81*b* by means of the compressed air, without scattering around the device, even when the chips M1 are located not only in the region near the chip collection port 81*b*, but also in the region away from the chip collection port 81*b*, and unfailingly introduced into the chip guiding member 81.

The plurality of the air discharge holes 82*e* are then arranged in parallel in a range corresponding to the chip falling area R1 in the horizontal direction orthogonal to the direction in which the chip guiding member 81 and the first air discharge unit 82 are arranged in parallel, and therefore, the compressed air discharged from the air discharge holes 82*e* of the air nozzle 82*a* moves towards the chip collection port 81*b* to spread over the whole region of the chip falling area R1 without gaps. Thus, wherever in the chip falling area R1 the chips M1 fall, the chips M1 can be unfailingly introduced into the chip guiding member 81 through the chip collection port 81*b* without scattering around the device.

Furthermore, the air discharge holes 82e each extend downwardly at an angle from a location near the bottom surface of the body case 2 towards the chip collection port 81b and thus, an amount of change in a moving direction of the chips M1 falling in the chip falling area R1 to change the direction towards the chip collection port 81b, is smaller as compared to the case where the compressed air is horizontally discharged from the air nozzle 82a towards the chip collection port 81b. Therefore, the chips M1 having fallen in the chip falling area R1 can be smoothly introduced into the chip collection port 81b by means of the compressed air, and efficiently collected.

In the embodiment of the present disclosure, the compressed air discharged from the air nozzle 82a and from the discharge nozzle 6a is supplied from the same air compressor 82b; however, the compressed air may be supplied from different sources.

Then, in the embodiment of the present disclosure, the air discharge holes 82e of the air nozzle 82a is shaped to extend downwardly at an angle; however, the air discharge holes 82e may be shaped to extend horizontally.

Further, in the embodiment of the present disclosure, the air nozzle 82a includes the plurality of the air discharge holes 82e; however, one air discharge hole 82e may be provided.

INDUSTRIAL APPLICABILITY

The present disclosure is suitable for a tip dresser for cutting a distal end of an electrode tip for spot welding.

DESCRIPTION OF REFERENCE CHARACTERS

1 Tip Dresser
2 Body Case (Housing Case)
4 Rotary Holder
4a Cutaway Part (Penetrating part)
4c Curved Recess
5 Cutter (Cutting Member)
6 Second Air Discharge Unit
8 Chip Collection Unit
10 Electrode Tip
10a Distal End
20 Hollow part
20a Upper Communication Hole
20b Lower Communication Hole
81 Chip Guiding Member
81b Chip Collection Port
82 First Air Discharge Unit
82a Air Nozzle
82e Air Discharge Hole
83 Chip Collector
C1 Axis of Rotation
M1 Chip
R1 Chip Falling Area

The invention claimed is:

1. A tip dresser comprising:
a housing case including a hollow part located therein and upper and lower communication holes opposing one another, the upper and lower communication holes communicating with the hollow part;
a rotary holder located in the hollow part between the upper and lower communication holes and axially and rotatably supported in the housing case, wherein the rotary holder includes a pair of curved recesses corresponding to the respective upper and lower communication holes and a penetrating part extending through along an axis of rotation;
a cutting member attached to an inner face of the penetrating part,
wherein the tip dresser is configured so that one of a pair of opposing electrode tips for spot welding is inserted into one of the curved recesses through the upper communication hole and another of the pair of the electrode tips is inserted into another of the curved recesses through the lower communication hole in the state that the rotary holder is being rotated, and thereby the cutting member cuts respective distal ends of the electrode tips;
a chip collection unit is-provided under the housing case,
wherein the chip collection unit is configured to collect chips produced in the penetrating part during a cutting operation and falling downwardly through the lower communication hole,
wherein the chip collection unit includes a chip guiding member provided on a bottom surface of the housing case on one lateral side of a chip falling area that is located downwardly of the lower communication hole,
wherein the chip guiding member includes a chip guiding passage for guiding the chips therein, and a first air discharge unit provided on a bottom surface of the housing case on another lateral side of the chip falling area,
wherein the chip guiding member further includes at one end thereof a chip collection port located corresponding to the chip falling area and communicating with the chip guiding passage,
wherein the chip guiding member is connected at another end thereof to a chip collector capable of collecting the chips,
wherein the first air discharge unit includes an air nozzle having a plurality of air discharge holes, the air nozzle being configured to discharge compressed air towards the chip collection port,
wherein the air nozzle is a block member having a triangular shape in a front view so that a vertical dimension progressively narrows in a direction towards the chip guiding member,
wherein each of the air discharge holes is arranged in parallel in a range corresponding to the chip falling area in a horizontal direction orthogonal to a direction in which the first air discharge unit and the chip guiding member are arranged in parallel, and is formed extending towards the chip collection port, and
wherein the chip collection port and a discharge opening of the air discharge holes are each located on an open peripheral edge of the lower communication hole, and each horizontally opposed to one another across the chip falling area.

2. The tip dresser according to claim 1, further comprising:
a second air discharge unit that is placed in close proximity above the housing case,
wherein the second air discharge unit is configured to discharge compressed air towards the rotary holder.

3. The tip dresser according to claim 2, wherein the air discharge holes each extend downwardly at an angle from a location near a bottom surface of the housing case towards the chip collection port.

4. The tip dresser according to claim 1, wherein the air discharge holes each extend downwardly at an angle from a location near a bottom surface of the housing case towards the chip collection port.

* * * * *